(No Model.)
T. S. DISSTON.
HANDSAW.
No. 495,931. Patented Apr. 18, 1893.
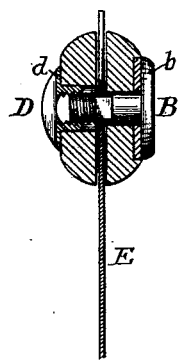
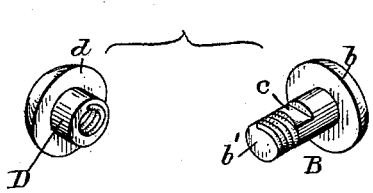
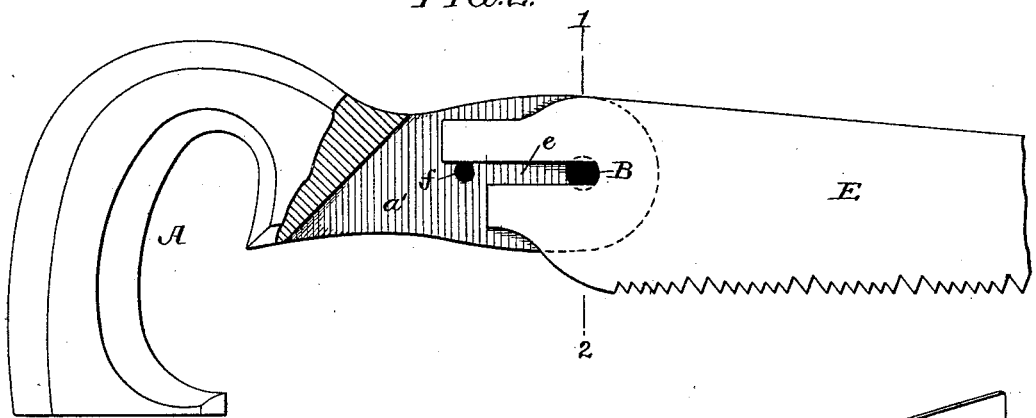
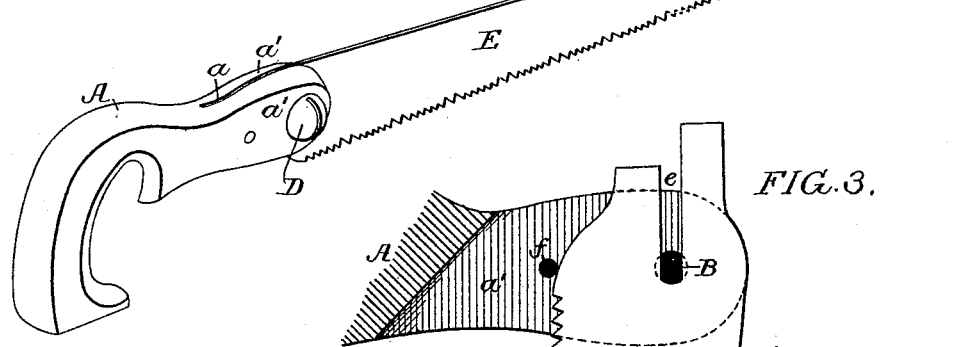
Witnesses.
Hamilton D. Turner
R. Schleicher
Inventor:
Thomas S. Disston
by his Attorneys.

UNITED STATES PATENT OFFICE.

THOMAS S. DISSTON, OF PHILADELPHIA, PENNSYLVANIA, ASSIGNOR TO THE HENRY DISSTON & SONS, INCORPORATED, OF SAME PLACE.

HANDSAW.

SPECIFICATION forming part of Letters Patent No. 495,931, dated April 18, 1893.

Application filed November 12, 1892. Serial No. 451,758. (No model.)

*To all whom it may concern:*

Be it known that I, THOMAS S. DISSTON, a citizen of the United States, and a resident of Philadelphia, Pennsylvania, have invented certain Improvements in Handsaws, of which the following is a specification.

The object of my invention is to so construct a saw and saw handle that the saw can be detached from the handle and clamped thereto without the use of a screw driver or wrench, the saw itself acting in that capacity.

In the accompanying drawings:—Figure 1, is a perspective view of my improved saw and handle. Fig. 2, is a side view of the handle partly broken away with the saw in position. Fig. 3, is a side view of a portion of the saw and handle. Fig. 4, is a sectional view on the line 1—2, Fig. 2, with the saw inserted therein. Fig. 5, is a similar sectional view with the saw in the position shown in Fig. 3; and Fig. 6, is a detached view of the bolt and nut.

My invention is especially adapted to compass saws where it is desired to detach the saw from the handle when the tool is carried in the carpenter's box, but it will be understood that it can be applied to all hand saws without departing from my invention.

A is the handle having a slot $a$ cut in the body portion, forming clamping portions $a'$, $a'$. The slot is wide enough to readily accommodate the thickest saw, so that the saw can be slipped into the slot without binding. The slot is sufficiently deep to give spring to the portions $a'$ of the handle, so that when the bolt and nut draw the two portions together, they will readily yield and confine the saw within the slot.

B is the bolt, shown clearly in Fig. 5. This bolt passes through the portion $a'$, and has a head $b$ bearing against one of said portions, as clearly shown in Fig. 3; a washer is preferably inserted between the head of the bolt and the handle. The shank $b'$ of the bolt has a flattened portion $c$, of a width slightly wider than the width of the slot $a$, and the outer end of the shank is screw-threaded, and adapted to the screw threads is a nut D having a head $d$ which bears against the portion $a'$ opposite that containing the bolt. The nut is adjusted upon the bolt in the first instance so as to adjust the handle to the thickness of the saw; after the bolt has been once set it needs no further adjusting. The head of the nut is slotted to receive a screw driver, or may be made square to receive a wrench.

E is the saw, having a slot $e$ at its base, as clearly shown in Fig. 2. This slot will receive the squared portion of the bolt B, and when the saw is turned it will turn the bolt. The saw is applied to the handle as shown in Fig. 3, and the bolt when in the position shown in this figure, is unscrewed, and the two portions $a'$ are a sufficient distance apart, to allow the saw to have free entrance into the slot $a$, after which the saw is turned in the direction of the arrow to the position shown in Fig. 2, the saw acting as a wrench to turn the bolt to draw the two portions $a'$ of the handle together, and thus confine the saw. A suitable stop $f$ may be used to limit the movement of the saw. The saw can be readily removed by turning it back to the position shown in Fig. 3,—in which position it is released and can be withdrawn. The bolt remains in position to again receive the saw, without further adjustment. Thus it will be seen that the wood-worker can carry a number of different sized saws with a single handle, and can readily mount them in the handle without the use of a screw driver or wrench, at the same time providing a handle which is smooth and neat in appearance, not having the projections common to saws of this class.

In some instances the nut may extend across the slot in the handle, and be formed to receive the saw, but I prefer to shape the bolt as shown.

I claim as my invention—

1. The combination, of a saw handle having two clamping portions, a single screw for drawing the two portions together, with a saw having a shank, the slot shaped at its inner end to engage the screw between the two clamping portions so that the screw will turn with the saw when it, the saw, is turned to position, thereby drawing the two clamping portions of the handle upon the saw blade, substantially as described.

2. The combination of a handle slotted to receive the saw and forming two clamping portions, with a bolt and nut mounted in the handle, the said bolt crossing the slot and shaped to receive the blade, a slotted saw-blade, the slot so shaped at its inner end as to engage the bolt and turn the same, so that when the saw-blade is fully introduced into the slot it will engage the bolt and on turning the blade to position the two portions of the handle will be drawn upon the blade by the bolt, substantially as described.

In testimony whereof I have signed my name to this specification in the presence of two subscribing witnesses.

THOMAS S. DISSTON.

Witnesses:
 HENRY HOWSON,
 JOSEPH H. KLEIN.